US010814329B2

(12) United States Patent
Niklewski et al.

(10) Patent No.: US 10,814,329 B2
(45) Date of Patent: Oct. 27, 2020

(54) ANTI-SPIN DUST SEAL FOR CONE AND GYRATORY CRUSHERS

(71) Applicant: Metso Minerals Industries, Inc., Waukesha, WI (US)

(72) Inventors: Andrzej Niklewski, Sao Paulo (BR); Paulo Barscevicius, Sao Paulo (BR)

(73) Assignee: Metso Minerals Industries, Inc., Waukesha, WI (US)

( * ) Notice: Subject to any disclaimer, the term of this patent is extended or adjusted under 35 U.S.C. 154(b) by 290 days.

(21) Appl. No.: 15/753,796

(22) PCT Filed: Aug. 19, 2016

(86) PCT No.: PCT/IB2016/054968
§ 371 (c)(1),
(2) Date: Feb. 20, 2018

(87) PCT Pub. No.: WO2017/033106
PCT Pub. Date: Mar. 2, 2017

(65) Prior Publication Data
US 2018/0243745 A1     Aug. 30, 2018

(30) Foreign Application Priority Data

Aug. 21, 2015   (EP) .................................. 15182027

(51) Int. Cl.
*B02C 2/04*     (2006.01)
*B02C 2/06*     (2006.01)
(Continued)

(52) U.S. Cl.
CPC ................ *B02C 2/047* (2013.01); *B02C 2/04* (2013.01); *B02C 2/045* (2013.01); *B02C 2/06* (2013.01);
(Continued)

(58) Field of Classification Search
CPC .............. B02C 2/04; B02C 2/042; B02C 2/02
See application file for complete search history.

(56) References Cited

U.S. PATENT DOCUMENTS 3,473,743 A * 10/1969 Winter .................... B02C 2/047
                                                          241/208
2002/0088886 A1* 7/2002 Zortman ................... B02C 2/06
                                                          241/207
2009/0283616 A1* 11/2009 Eriksson ................. B02C 2/047
                                                          241/25

FOREIGN PATENT DOCUMENTS

CN          201168614 Y     12/2008
EP            2775176 A1     9/2014
(Continued)

OTHER PUBLICATIONS

International Search Report and Written Opinion for PCT/IB2016/054968 dated Oct. 31, 2016.
(Continued)

*Primary Examiner* — Shelley M Self
*Assistant Examiner* — Fred C Hammers
(74) *Attorney, Agent, or Firm* — Andrus Intellectual Property Law, LLP (57) ABSTRACT

A dust seal for a cone crusher or gyratory crusher and a cone crusher or gyratory crusher are provided, wherein the crusher includes a stationary part having a dust collar, and a crusher head which is supported so as to be rotatable relative to the stationary part in a crushing direction of rotation and in an idling direction of rotation which is opposite to the crushing direction of rotation. The dust seal has a crusher head contact portion configured for directly or indirectly contacting the crusher head, and a dust collar contact portion configured for directly or indirectly contacting the dust collar crusher head. The dust seal is configured to impart a frictional force between the crusher head and the dust seal (Continued)

via the crusher head contact portion, and/or between the dust collar and the dust seal via the dust collar contact portion upon rotation of the crusher head at least in the idling direction of rotation. The invention is characterized in that the dust seal is configured so that the frictional force imparted by the dust collar contact portion and/or the crusher head contact portion is higher upon rotation of the crusher head in the idling direction of rotation than upon rotation of the crusher head in the crushing direction of rotation.

18 Claims, 5 Drawing Sheets

(51) Int. Cl.
*F16J 15/3208* (2016.01)
*B02C 13/18* (2006.01)

(52) U.S. Cl.
CPC ............ *F16J 15/3208* (2013.01); *B02C 2/042* (2013.01); *B02C 13/1807* (2013.01)

(56) References Cited

FOREIGN PATENT DOCUMENTS

| | | |
|---|---|---|
| GB | 1570015 A | 6/1980 |
| RU | 2412762 C2 | 2/2011 |
| SU | 1762062 A1 | 9/1992 |

OTHER PUBLICATIONS

International Preliminary Report on Patentability and Written Opinion for PCT/IB2016/054968 dated Dec. 6, 2017.
Decision on Grant for Russian Patent Application No. 2018109501 dated Feb. 19, 2019.
Office Action for Chinese Patent Application No. 201680048173.8 dated Mar. 15, 2019.

* cited by examiner

ANTI-SPIN DUST SEAL FOR CONE AND GYRATORY CRUSHERS

CROSS-REFERENCE TO RELATED APPLICATIONS

This application is the U.S. national stage application of International Application PCT/IB2016/054968 filed Aug. 19, 2016, which international application was published on Mar. 2, 2017, as International Publication WO 2017/033106 in the English language. The International Application claims priority of European Patent Application 15182027.1, filed Aug. 21, 2015.

FIELD OF THE INVENTION

The present invention relates to a dust seal for a gyratory crusher or cone crusher.

Cone crushers and gyratory crushers are two types of rock crushing systems, which generally break apart rock, stone or other material in a crushing gap between a stationary element and a moving element. A cone or gyratory crusher is comprised of a head assembly including a crusher head that gyrates about a vertical axis within a stationary bowl attached to a main frame of the rock crusher. The crusher head is assembled surrounding an eccentric that rotates about a fixed shaft to impart the gyrational motion of the crusher head which crushes rock, stone or other material in a crushing gap between the crusher head and the bowl. The eccentric can be driven by a variety of power drives, such as an attached gear, driven by a pinion and countershaft assembly, and a number of mechanical power sources, such as electrical motors or combustion engines.

The gyrational motion of the crusher head with respect to the stationary bowl crushes rock, stone or other material as it travels through the crushing gap. The crushed material exits the cone crusher through the bottom of the crushing gap.

A dust seal is typically provided between a dust collar, which carried by the stationary frame structure, and the movable crusher head to prevent the entrance of rock dust or the like into the operating mechanism of the crusher.

A problem which is frequently encountered in cone and gyratory crushers is the fact that in starting up a crusher and with the crusher substantially under no load, the crusher head will not only gyrate as the eccentric sleeve rotates, but will also tend to rotate with the eccentric sleeve due to the bearing drag between the rotating eccentric sleeve and the crusher head. Thus, for example, the eccentric sleeve may be rotating at some speed such as 300 r.p.m., and the bearing drag between the unloaded crusher head and the rotating eccentric sleeve may be such that the crusher head or headcenter will rotate at a speed less than that of the rotating eccentric sleeve. This spinning rotation of the headcenter in the so-called idling direction of rotation is undesirable since it causes the rocks and stones which are being loaded into the crusher to be thrown about and even to be thrown out of the crusher.

However, when the crusher is under load, it is important that the crusher head be capable of moving relatively slowly in retrograde direction with respect to the direction of rotation of the eccentric sleeve, i.e. in the so-called crushing direction of rotation.

In the prior art, different solutions have been proposed in order to prevent spinning of the crusher head or headcenter when the crusher is not under load, while permitting a retrograde rotation of the crusher head relative to the rotating eccentric under load conditions. The prior art solutions used clutches, cardans, or friction systems against a fixed part.

For example, U.S. Pat. No. 3,539,119 illustrates a brake device provided precisely for this purpose, and U.S. Pat. No. 6,648,255 discloses a crusher head comprising a one-way clutch to inhibit spinning and a friction torque limiting clutch to protect the one-way clutch against excessive loads.

However, when the head or shaft can vary its vertical positioning, the solutions became to be less efficient, more costly and complicated. Furthermore, when no spider bushing reducing the spinning by imparting friction between the top busing and the shaft is present in the crusher, such solutions turn out not to be sufficient.

EP 2 775 176 A1 teaches a gyratory crusher sealing ring to provide a seal between a discharge zone positioned below a crushing chamber and a working part zone of the crusher that accommodates various bearing assemblies and drive components that provide gyroscopic precession of the head and inner crushing shell within the crusher.

SUMMARY OF THE INVENTION

An object of the present invention is to provide a solution for preventing spinning of the crusher head of a cone or gyratory crusher, which solution is also applicable for crushers having no spider bushing and/or having a head or shaft variable in its vertical position.

In view of the above, the present invention provides a dust seal for a gyratory or cone crusher as recited in claim 1, and a cone or gyratory crusher including such a dust seal.

According to the invention, a dust seal provided within the cone or gyratory crusher is modified so as to additionally fulfil an anti-spin function. Consequently, the anti-spin solution of the present invention makes use of existing parts rather than adding a complicated structure to the crusher. The solution of the invention is structurally simple as well as cost efficient. What is more, the inventive solution is equally applicable to crushers in which the crusher head or shaft can variate its vertical positioning.

Optional features are recited in the dependent claims.

In particular, at least one protrusion may be configured such that a frictional force imparted between the at least one protrusion and the dust collar at the dust collar contact portion and/or the crusher head at the crusher head contact portion upon rotation of the crusher head is higher in the idling direction of rotation than in the crushing direction of rotational. Preferably, the protrusion has a substantially triangular shape, viewed in a plane parallel to the plane defined by the dust seal. Further, the at least one protrusion may be at least 2 mm, preferably at least 4 mm, thick in the direction perpendicular to the plane defined by the dust seal. Furthermore, a base may be provided and the at least one protrusion may protrude for at least about 5 mm, preferably at least 10 mm, from the base. Preferably, the protrusions comprise a resilient material, more preferably polyurethane. The number of protrusions is preferably equal to or more than 10, more preferably more than 30.

BRIEF DESCRIPTION OF THE DRAWINGS

The above, as well as additional objects, features and advantages of the present invention will be better understood through the following illustrative and non-limiting detailed description of preferred embodiments of the present invention with reference to the appended drawings, where the same reference numerals will be used for similar elements, wherein.

DETAILED DESCRIPTION OF PREFERRED EMBODIMENTS

Figure 1:
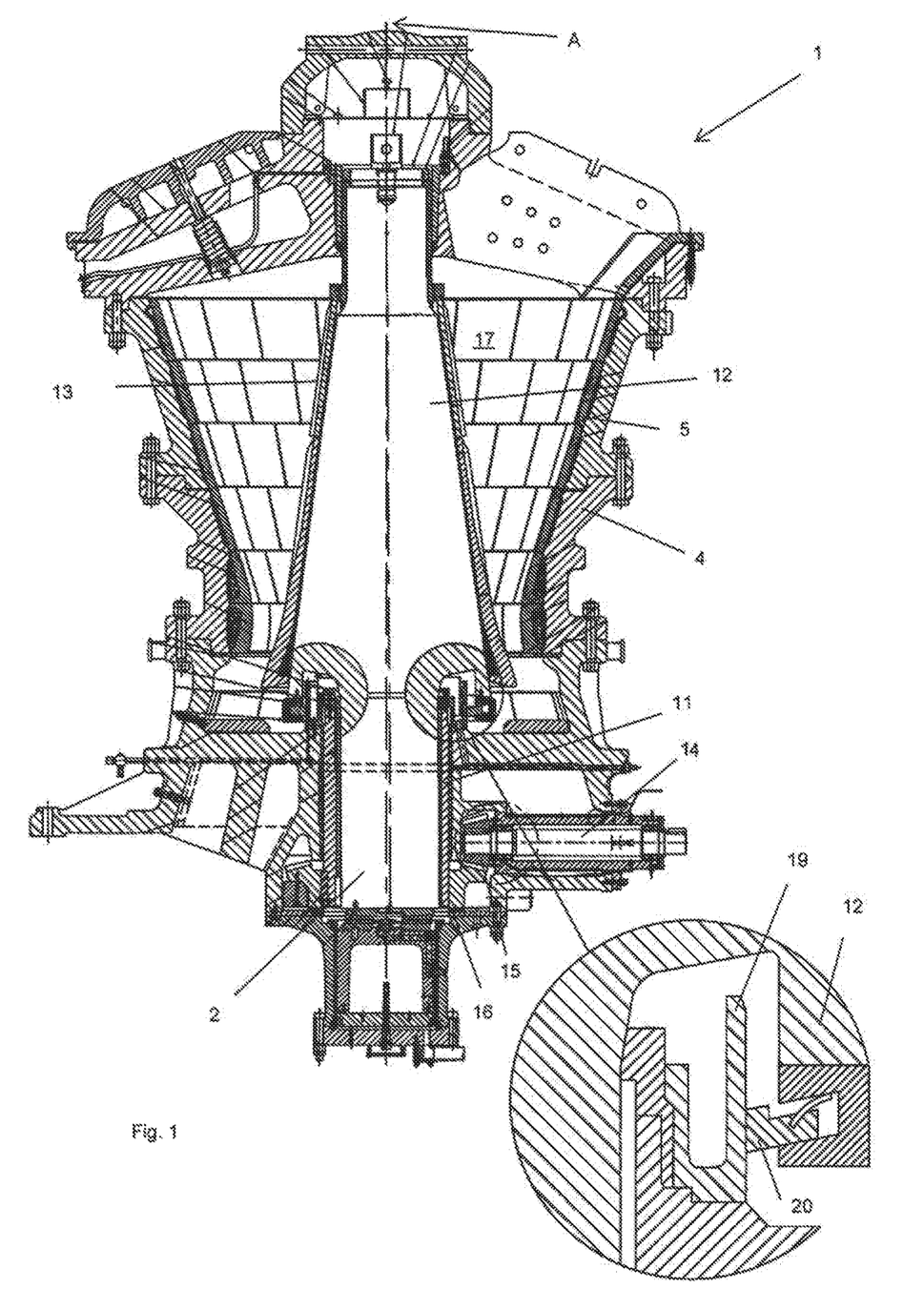
FIG. 1 shows schematically a gyratory crusher according to a first embodiment.

FIG. 1 schematically illustrates a gyratory crusher 1 in section. The gyratory crusher 1 has a vertical shaft 2 and a bowl or frame 4. The shaft 2 has a longitudinal axis, and the crusher bowl 4 has a central axis A.

A crusher head 12 is formed integrally with the shaft 2. An eccentric element 11 is provided to impart a gyratory movement to the shaft 2 and thereby to the crusher head 12, so that the crusher head 12 gyrates relative to the bowl 4. The outer peripheral surface of the eccentric element 11, which is concentric relative to the central axis A, is rotatably supported within the surrounding structure by means of an outer rotational shaft bearing, such as a rotational slide bushing. The inner peripheral surface of the eccentric element 11, which is eccentrically arranged, is rotatably supported about the shaft 2 via an inner rotational bearing, such as another rotational slide bushing. Together, the inner and outer bearings form an eccentric bearing arrangement for guiding the crusher head 12 along a gyratory path.

A drive shaft 14 is connected to a drive motor and is provided with a pinion 15. The drive shaft 14 is arranged to rotate the eccentric element (also simply referred to as "eccentric") 11 by the pinion 15 engaging a gear rim 16 mounted on the eccentric 11.

When the drive shaft 14 rotates the eccentric 11, during operation of the crusher 1, the crusher head 12 mounted thereon will execute a gyrating movement.

An inner crushing shell 13 is mounted on the crusher head 12. An outer crushing shell 5 is mounted on the frame 4. A crushing gap 17 is formed between the two crushing shells 13, 5. When the crusher 1 is operated, material to be crushed is introduced in the crushing gap 17 and is crushed between the inner crushing shell 13 and the outer crushing shell 5 as a result of the gyrating movement of the crusher head 12, during which movement the two crushing shells 13, 5 approach one another along a rotating generatrix and move away from one another along a diametrically opposed generatrix.

A dust seal 20 is provided between a dust collar 19, which carried by the stationary frame structure, and the movable crusher head 12.

Figure 2:
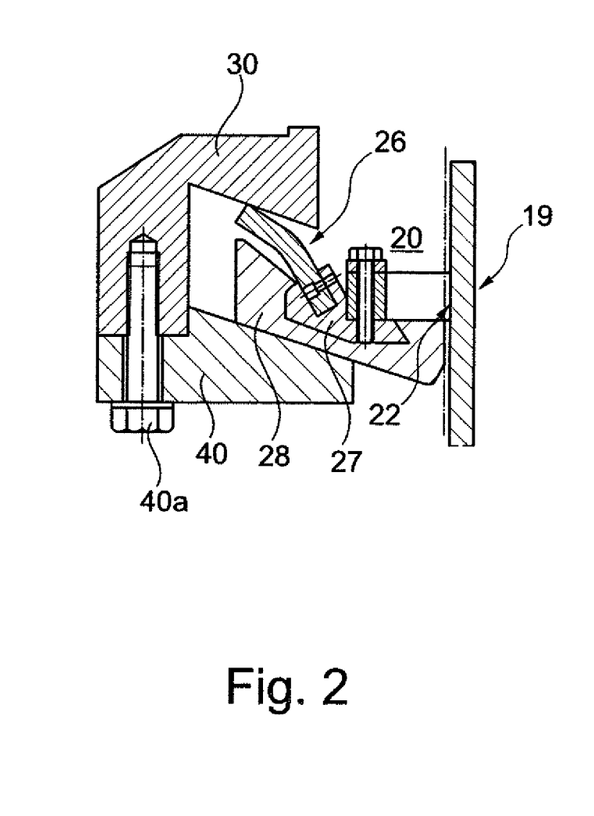
FIG. 2 shows schematically a cross-section of a dust seal according to the invention.

FIG. 2 illustrates a second embodiment of a dust seal 20 of the present invention. While the embodiment of FIG. 2 differs from the one of FIG. 1 in certain respects, the provision of a dust seal 20 between a dust collar 19 and the crusher head 12 is basically similar in both embodiments. FIG. 2 includes a detailed view of the dust seal 20, which makes it clear that the dust seal 20, in the present embodiment, is mainly comprised of four components: a holder 27, a friction lip 26 (also referred to as crusher head contact portion of the dust seal) screw connected to the holder 27, a toothed ring 22 (also referred to as a dust collar contact portion of the dust seal) also screw connected to the holder 27, and a form part 28 accommodating the holder 27. Each of these four constituents is essentially ring shaped, and the form part 28 accommodates the holder 27 in a form-fitting manner.

In order to mount the dust seal 20 within the crusher and particularly between the crusher head 12 and dust collar 19 thereof, a mounting structure is provided. In the present embodiment, the mounting structure includes a first mounting part 30 for being assembled to the crusher head 12. The first mounting part 30 is essentially ring shaped so as to be screw connected to a rim in the lower area of the crusher head 12, in the manner illustrated in FIG. 2. The mounting structure further includes a second mounting part 40 which in the present embodiment is also essentially ring shaped and which is assembled to the first mounting part 30 from below by means of a screw 40a. The dust seal 20 is assembled between the two mounting parts 30, 40 in a manner that the friction lip 26 contacts the first mounting part 30 whereas the form part 28 contacts the second mounting part 40. Upon mounting the dust seal 20 between the two mounting parts 30, 40, the friction lip 26 is deflected to a certain extent so as to provide for a defined frictional support of the dust seal 20 relative to the mounting structure. The dust seal 20 is, however, not entirely fixed by the mounting structure, but slidable relative to the first 30 and second mounting parts 40 as will be explained in more detail below.

The dust seal 20 is retained by the mounting structure so that the toothed ring 22—which will be described in more detail below—contacts the dust collar 19, providing for a sealing between the moving head 12 and the stationary dust collar 19, to prevent the entrance of rock dust or the like into the operating mechanism of the crusher.

More specifically, in the embodiments shown in the figures, the dust seal 20 is movable relative to the dust collar 19 in the tangential direction, and the dust collar contact portion 22 of the dust seal 20 can rotate around the dust collar 19. Further, between the crusher head contact portion of the dust seal 20 and the crusher head 12, i.e. by deflecting the friction lip 26 and pressing the form part 28 against the second mounting part 40, friction between the crusher head 12 and the dust seal 20 is so high (potentially after appropriate adjustments) that the crusher head 12 and the dust seal 20 basically do not rotate relative to each other in the tangential direction, i.e. the dust seal 20 rotates together with the crusher head 12. In other words, the dust seal 20 is clamped between the mounting parts 30, of the crusher head 12 at the crusher head contact portion 26, 28 of the dust seal 20 so that relative tangential movement is prevented.

Naturally, due to the eccentric movement of the crusher head 12 during the gyratory movement, the crusher head needs to be movable relative to the dust seal 20 in the radial direction. This is achieved by providing between the crusher head 12 and the dust seal 20 a connection that allows for radial movements relative to each other. With reference to FIG. 2, the connection allows the head 12 to be in a position radially close to the dust collar 19, and in a position radially further away from the dust collar 19.

In the embodiment of FIG. 2, an inclined upper surface of the mounting part 40 and a basically parallel inclined lower surface of the mounting part 30 are provided, wherein the mounting parts 30 and 40 basically form a recess. The form part 28 and the lip 26 of the dust seal 20 can slide along these inclined surfaces of the mounting parts 40, 30 in the radial direction, respectively. Hence, the lip 26 and the form part 28 can slide along the two mounting parts 30, 40 of the head 12 between a position where the lip 26 and the form part 28 extend far into the recess formed by the form parts 30, 40 (when the head 12 is in a position radially close to the dust collar 19), and a position where the lip 26 and the form part 28 do not extend far into the recess formed by the form parts 30, 40 (when the head 12 is in a position radially further away from the dust collar 19).

The inclination of the surfaces of the mounting parts 30, 40 is provided such that the slope from the radially outermost portion of the mounting parts 30, 40 to the radially innermost portion, respectively, is negative. Hence, the inclination of the mounting parts 30, 40 is such that the force created by the lip 26 by pressing against the mounting part 30 ensures that the dust seal 20 remains in its lowest possible position, in which the dust seal contacts the dust collar contact portion 24, and does not follow the head 12 when moving further away from the dust seal during the gyratory movement, for example. Hence, when the dust seal 20 is in its lowest position, contact with the dust collar 19 and sufficiently high friction at the dust collar contact portion 24 upon rotation of the dust seal 20 (together with the crusher head 12) relative to the dust collar 19 at least in the idling direction of rotation is ensured.

Figure 3A:
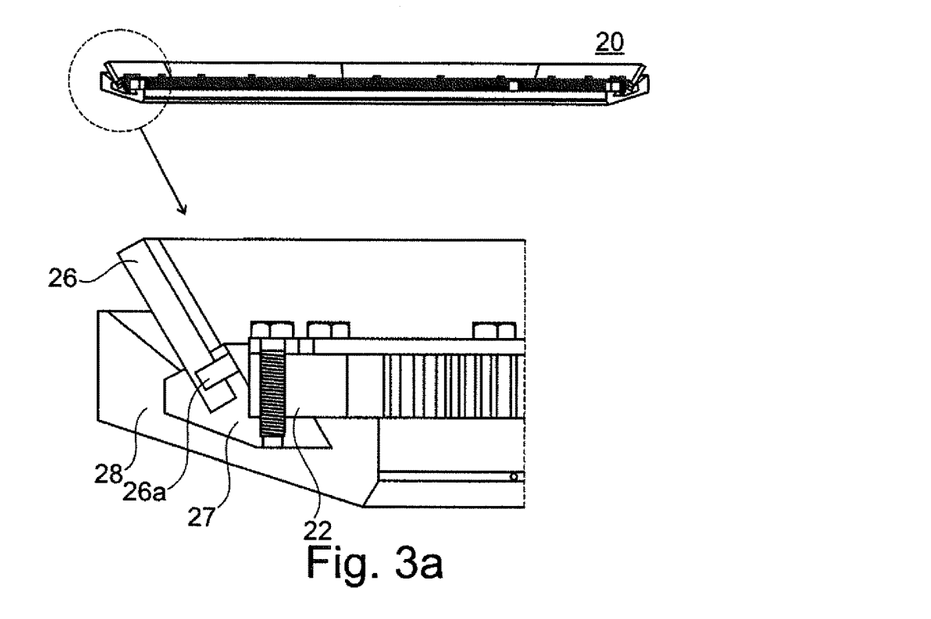
FIGS. 3a and 3b are a front view and a perspective view, respectively, of a dust seal according to the present invention.
Figure 3B:
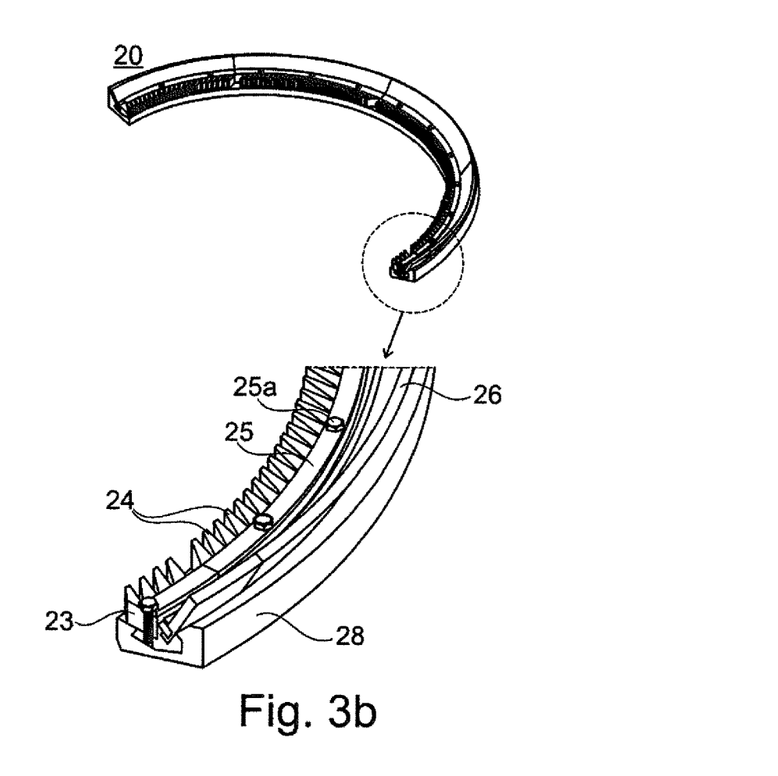

FIGS. 3a and 3b illustrate the dust seal 20 in a state in which it is disassembled from the crusher. As explained above with reference to FIG. 2, the dust seal 20 is essentially comprised of the form part 28, holder 27, friction lip 26 and toothed ring 22.

Also illustrated in FIGS. 3a and 3b is a fastening ring 25 provided for fastening the toothed ring 22 to the holder 27 by means of screws 25a, as well as screws 26a used for fastening the friction lip 26 to the holder 27.

FIG. 3b shows the configuration of the toothed ring 22 in more detail: it includes a ring shaped base part 23 and a series of teeth 24 protruding inward from the base part 23, i.e. protruding toward the dust collar 19 in the mounted state of the dust seal 20. The teeth 24 therefore establish the contact between the dust seal 20 and the dust collar 19, i.e. the dust collar contact portion.

In accordance with the invention, the crusher is provided with means for reducing spinning of the crusher head 12 which is effective substantially only during the no load or idling operation of the crusher. According to the invention, this anti-spin function is associated with the dust seal 20 in a manner which will now be described.

Figure 4:
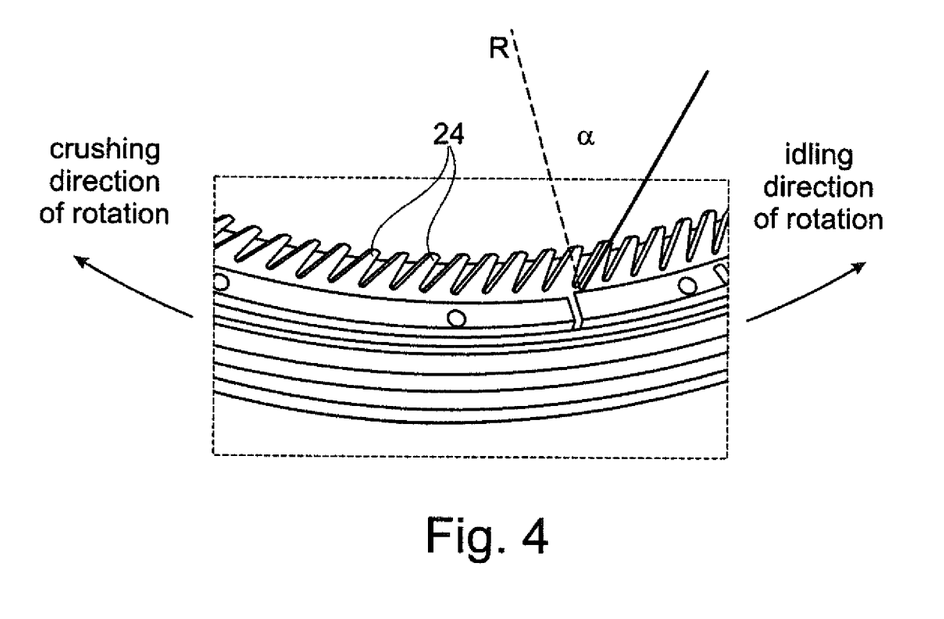
FIG. 4 is a top view of the dust seal.

As can be best seen in FIG. 4, which is a top view of a part of the dust seal 20, the teeth 24 have a specific configuration which makes it possible to use the teeth 24 not only as a dust sealing structure, but also and in particular in order to establish an anti-spin function to prevent the crusher head 12 from spinning. As illustrated in FIG. 4, the teeth 24 do not protrude precisely in the radial direction of the toothed ring 22, i.e. towards the center point of the ring 22, but the teeth 24 are inclined to a certain extent relative to the radial direction and toward the circumference of the toothed ring 22.

Upon mounting the dust seal 20 within the crusher, the dust seal 20 is positioned so that the inclination of the teeth 24 provides a high interference between the crusher head 12 and the dust collar 19 when the crusher head 12, and the dust seal 20 mounted thereto, tend to rotate in the idling direction: in this case, the inclined teeth 24 provide for a high friction between head 12 and collar 19 because they are inclined towards the idling direction of rotation. If the crusher head 12 and the dust seal 20 tend to rotate in the crushing direction, only a low interference (low friction) is created by the dust seal 20, because the teeth 24 are inclined away from the crushing direction of rotation.

The angle $\alpha$ of inclination of one tooth 24 relative to the radial direction, which is designated R in FIG. 4, is appropriately set.

Figure 5A:
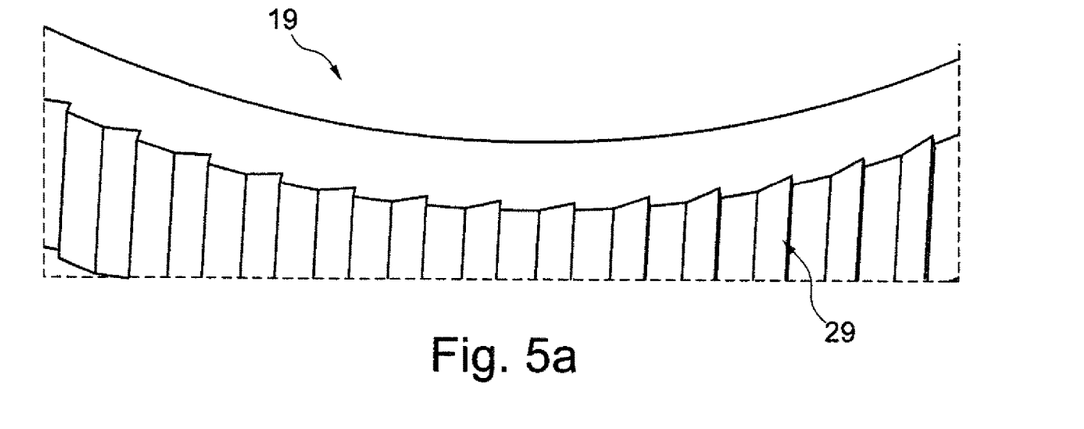
FIGS. 5a and 5b are a perspective view of the dust collar and a top view of the dust collar and the dust seal, respectively.
Figure 5B:
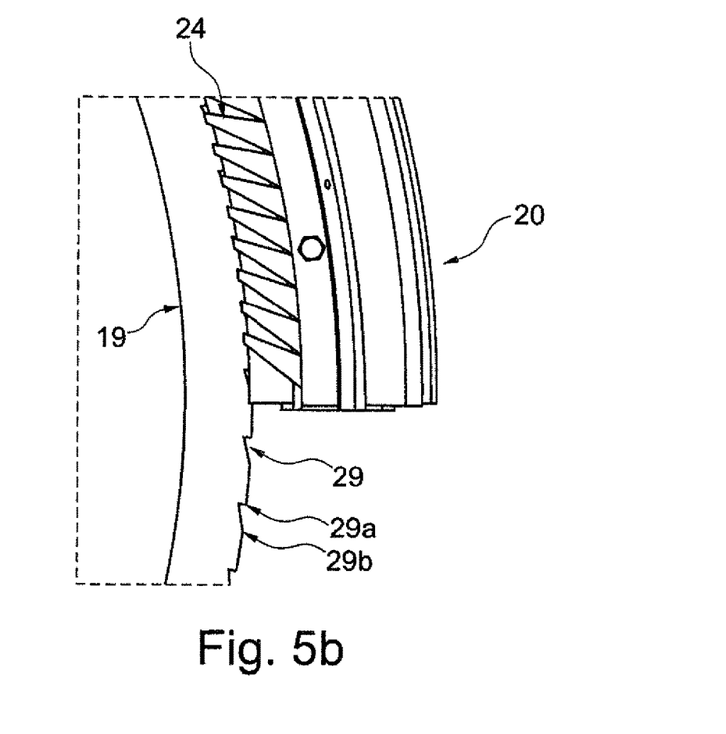

Further, the dust collar 19 is shown in more detail in FIG. 5. The ring-shaped collar 19 comprises a plurality of recesses 29 complementary to the protrusions 24 of the dust seal 20 and formed in the radially outer side of the collar facing the dust collar contact portion 24 of the dust seal 20. The angle between the bottom of the recess 29 and the outer surface of the ring shaped dust collar 19 is different at the leading 29a and trailing 29b edge of the recess 29, when viewed in the tangential direction. The angles are set such that the protrusions 24 of the dust seal can engage with the recesses 29, such that a higher resistance is imparted upon rotation of the crusher head 12 in the idling direction of rotation than upon rotation of the crusher head in the crushing direction of rotation. This additional resistance increases the frictional force between the dust seal 20 and the dust collar 19 upon rotation of the crusher head in the idling direction of rotation, such that spinning can more reliably be prevented.

Moreover, the recesses 29 are formed as grooves substantially or mainly extending parallel to the main axis A of the crusher and to the main shaft 2, i.e. in the vertical direction, such that the dust seal 20 can move vertically in the grooves. Hence, the dust seal 20 can be moved vertically together with the crusher head 12 relative to the dust collar 19 and frame 4 without impairing the function of the dust seal 20.

The anti-spin solution of the present invention makes use of the existing dust seal rather than adding a complicated structure to the crusher. The solution of the invention is structurally simple as well as cost efficient.

The dust seal and crusher according to the present invention are not limited to the embodiments described above, but can have alternative configurations within the scope of the invention as defined by the claims.

For example, the crushers described above and illustrated in the drawings have the crusher head 12 journalled to the eccentric outer surface of the eccentric 11, whereas the main shaft 2 extends along the main axis A of the crusher, so that the eccentric rotates about the main shaft 2 and applies a gyratory movement to the crusher head 12. The present invention is, however, equally applicable to crushers which have the crusher head journalled to the main shaft which in turn is journalled to an eccentric inner surface of the eccentric, so that the gyratory movement is applied to the main shaft.

In a modified embodiment of the above described dust seal comprising the holder 27, the friction lip 26 screw connected to the holder 27, the toothed ring 22 and the form part 28 accommodating the holder 27, at least two of these parts are integrally formed. It is also possible to integrate all of these parts with each other, so as to obtain a one-piece structure.

Further, the present invention has been explained in detail on the basis of embodiments in which the dust seal 20 rotates together with the crusher head 12 and relative to the dust collar 19, such that the inclined teeth for preventing spinning are provided at the dust collar contact portion of the dust seal. However, the present invention also relates to embodiments in which the crusher head rotates relative to the dust seal and the dust seal does not rotate relative to the dust collar, when the dust seal and the dust collar are configured such that tangential movement between the dust collar and the dust seal is prevented. In such "inverse" embodiments, inclined teeth could be provided at the crusher head contact portion of the dust seal and recesses could be provided at a mounting portion of the crusher head, for example. Furthermore, the preferred embodiments defined in the dependent claims are also conceivable for such "inverse" embodiments, i.e. the features defined in connection with the dust collar contact portion of the dust seal and the dust collar in the dependent claims could be provided at the crusher head contact portion and the crusher head or crusher head mounting portion, respectively.

Finally, while the crusher illustrated in FIG. 1 includes a spider supporting the shaft 2 at the top end thereof, the dust seal of the present invention is equally applicable to crushers not using such a spider.

What is claimed is:

1. A dust seal for a cone crusher or gyratory crusher, the crusher including a stationary part comprising a dust collar, and a crusher head which is supported so as to be rotatable relative to the stationary part in a crushing direction of rotation and in an idling direction of rotation which is opposite to the crushing direction of rotation, the dust seal comprising:
   a crusher head contact portion configured for directly or indirectly contacting the crusher head, and a dust collar contact portion configured for directly or indirectly contacting the dust collar, and
   the dust seal being configured to impart a frictional force between the crusher head and the dust seal via the crusher head contact portion, and/or a frictional force between the dust collar and the dust seal via the dust collar contact portion upon rotation of the crusher head at least in the idling direction of rotation,
   wherein the dust seal is configured so that the frictional force imparted by the dust collar contact portion and/or the crusher head contact portion is higher upon rotation of the crusher head in the idling direction of rotation than upon rotation of the crusher head in the crushing direction of rotation.

2. The dust seal of claim 1, in which the stationary part includes a stationary frame and the dust collar mounted to the stationary frame, wherein the dust seal is configured so as to be in sealing contact with the dust collar and/or the crusher head upon mounting the dust seal to the crusher.

3. The dust seal of claim 1, comprising a plurality of protrusions arranged on the dust collar contact portion for sealingly contacting the dust collar and/or on the crusher head contact portion for sealingly contacting the crusher head, and protruding from a base of the dust collar.

4. The dust seal of claim 3, wherein at least one of the protrusions is configured such that a frictional force imparted between the at least one protrusion and the dust collar at the dust collar contact portion and/or the crusher head at the crusher head contact portion upon rotation of the crusher head is higher in the idling direction of rotation than in the crushing direction of rotation.

5. The dust seal of claim 3, wherein the dust seal is a ring-shaped dust seal and at least one of the protrusions is more deformable in a first tangential direction of the ring-shaped dust seal upon rotation of the head in the crushing direction of rotation, than in a second tangential direction of the ring-shaped dust seal upon rotation of the crusher head in the idling direction of rotation, which is opposite to the first tangential direction of the ring-shaped dust seal upon rotation of the head in the crushing direction of rotation.

6. The dust seal of claim 3, wherein the dust seal is a ring-shaped dust seal and at least one of the protrusions is inclined relative to a radial direction of the ring-shaped dust seal towards a tangential direction upon rotation of the head in the idling direction of rotation so as to impart the higher frictional force in the idling direction of rotation.

7. The dust seal of claim 3, wherein at least one of the protrusions has a substantially triangular shape, viewed in a plane parallel to a horizontal plane defined by the dust seal.

8. The dust seal of claim 3, wherein at least one of the protrusions is at least 2 mm thick in a radial direction of the dust seal.

9. The dust seal of claim 3, wherein at least one of the protrusions protrudes for at least 5 mm from the base.

10. The dust seal of claim 3, wherein the protrusions comprise a resilient material.

11. The dust seal of claim 3, wherein at least 30 protrusions are provided.

12. The dust seal of claim 1, wherein the crusher head contact portion further comprises a friction lip for sealingly contacting the crusher head.

13. The dust seal of claim 1, further comprising a holder to which the dust collar contact portion and/or the crusher head contact portion are mounted.

14. The dust seal of claim 13, further comprising a form part accommodating the holder in a form-fitting manner.

15. A cone or gyratory crusher, the crusher comprising:
   a stationary part comprising a dust collar, and a crusher head which is supported so as to be rotatable relative to the stationary part in a crushing direction of rotation and in an idling direction of rotation which is opposite to the crushing direction of rotation, and a dust seal including a crusher head contact portion configured for directly or indirectly contacting the crusher head, and a dust collar contact portion configured for directly or indirectly contacting the dust collar;
   wherein the dust seal is configured to impart a frictional force between the crusher head and the dust seal via the crusher head contact portion, and/or a frictional force between the dust collar and the dust seal via the dust collar contact portion upon rotation of the crusher head at least in the idling direction of rotation;
   wherein the dust seal is configured so that the frictional force imparted by the dust collar contact portion and/or the crusher head contact portion is higher upon rotation of the crusher head in the idling direction of rotation than upon rotation of the crusher head in the crushing direction of rotation; and
   wherein the dust seal being provided between the crusher head and the dust collar so as to provide a sealing to prevent the entrance of rock dust into an operating mechanism of the crusher.

16. The crusher according to claim 15, further comprising a rotatable eccentric to which the crusher head is journalled,
   wherein the dust seal is configured such that the frictional force imparted between the crusher head and the dust collar upon rotation of the head in the idling direction of rotation exceeds the frictional force imparted between the head and the eccentric upon rotation of the eccentric in the idling direction of rotation, preventing the head from being rotationally dragged by the eccentric in the idling direction of rotation.

17. The crusher according to claim 15, the dust collar being configured to increase the frictional force between the dust collar and the dust collar contact portion upon rotation of the crusher head in the idling direction of rotation, the dust collar having a recesses configured to receive protrusions of the dust collar contact portion.

18. The dust seal according to claim 1, wherein the dust seal is ring-shaped.

\* \* \* \* \*